March 20, 1956  D. E. SUNSTEIN  2,739,307
PULSE-ECHO SYSTEM FOR PROVIDING INDICATIONS OF MOVING
OBJECTS IN RESPONSE TO THE REFLECTION OF A SINGLE
TRANSMITTED PULSE
Filed Aug. 31, 1946
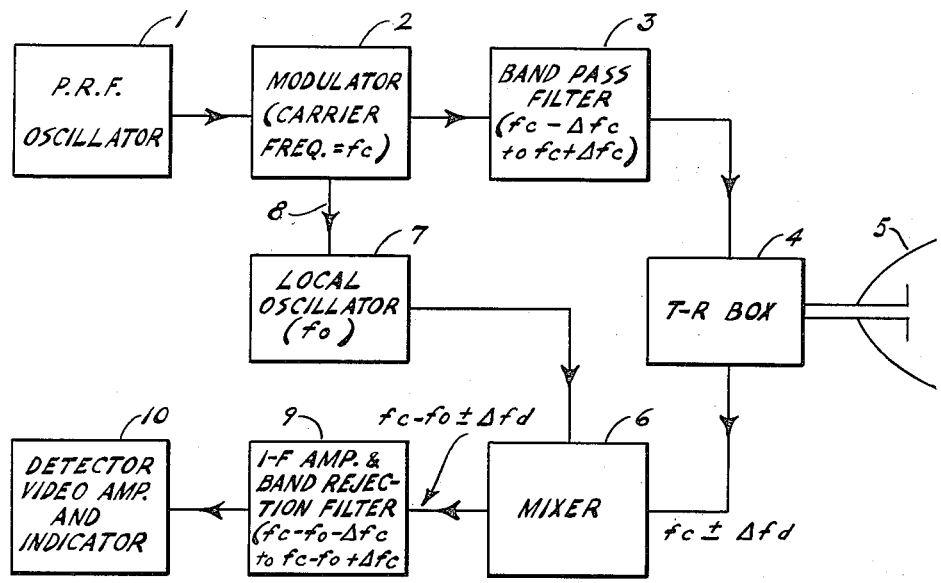
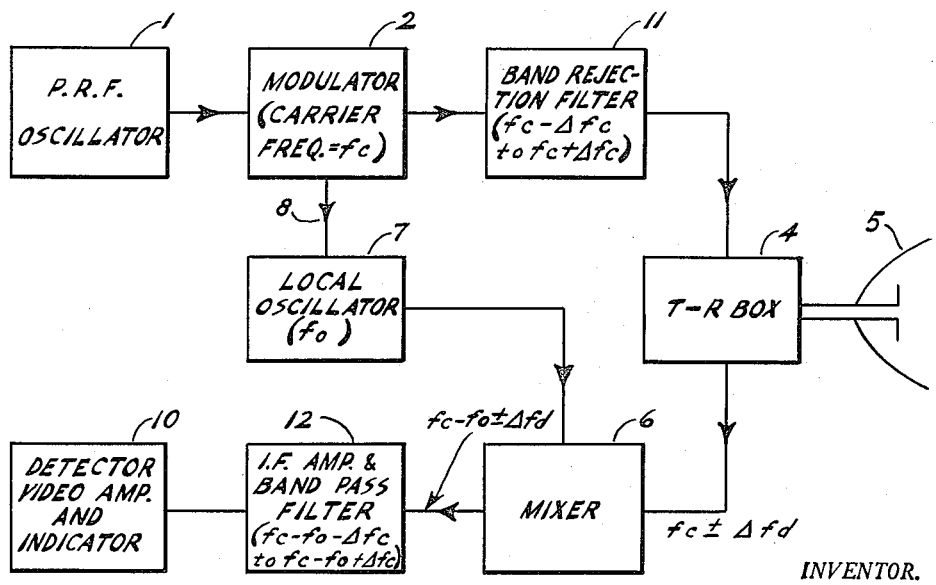
INVENTOR.
DAVID E. SUNSTEIN
BY
Brown, Denk & Lynnestvedt
AGENTS

United States Patent Office 2,739,307
Patented Mar. 20, 1956

2,739,307

PULSE-ECHO SYSTEM FOR PROVIDING INDICATIONS OF MOVING OBJECTS IN RESPONSE TO THE REFLECTION OF A SINGLE TRANSMITTED PULSE

David E. Sunstein, Cynwyd, Pa., assignor to Philco Corporation, Philadelphia, Pa., a corporation of Pennsylvania Application August 31, 1946, Serial No. 694,297

3 Claims. (Cl. 343—7.7)

This invention relates to radar systems, and in particular to such systems for indicating the presence of targets moving with reference to the radar transmitter.

Systems for this purpose are known in the prior art, but in general they operate on the principle of storing a radar response from a target or group of targets and comparing it at some later time with a subsequent response from the same target or targets, which in the interim may have moved by some finite amount with reference to the transmitter. The means used to effect such storage are, generally speaking, rather complex, and, in some instances, not altogether reliable. Moreover, in such systems, employing a scanning antenna to obtain responses from a plurality of targets or from a target area, the rate of scanning must be relatively low in order that stationary targets may not be confused with moving ones. This obviously limits the flexibility and usefulness of the system.

The principal object of the invention is to overcome these disadvantages of prior systems, and to provide a system which instantaneously gives an indication of target motion without the need for storage and comparison. While achieving this objective the system is greatly simplified, and its flexibility and reliability increased.

In outline, this objective is achieved by transmitting time-spaced pulse signals comprising principally frequency components within a predetermined circumscribed range or ranges and of duration such that, when such pulse signals impinge on target objects which are moving with reference to the transmitter, and are reflected therefrom, additional frequency components are produced therein which are detectable at a receiver to indicate such motion. In the case of radial motion of a target object either toward or away from the transmiter, the shift in frequency has been obesrved to be maximum and is believed to be caused primarily by Doppler effect. However, detectable frequency shifts also are produced by a target moving tangentially with reference to the transmitter and, in this case, are believed to be caused, at least in part, by the inherent variation in the intensity, throughout its cross-section, of the beam of energy transmitted from a conventional radar antenna. Owing to this condition, tangential motion of the target produces amplitude modulation of the reflected energy, giving rise to the generation of sideband components which are outside the band of frequencies transmitted. Also it has been noted that additional frequency components indicative of target motion are obtained when a target moves with reference to another object so that a varying portion of the target lies in the shadow of the object, and also when a target moves between the transmiter and a land mass or other signal-reflecting background so as to cast its shadow thereon. It is apparent, therefore, that the shifted frequency components indicative of target motion may be produced by one or a combination of several different phenomena.

For optimum production of such detectable frequency components it may be desirable to make the duration of transmitted pulses of high frequency energy greater than in a conventional radar system. On the other hand, inasmuch as the minimum range at which targets are detectable is directly related to the duration of transmitted pulses, it may be desirable to make the pulse duration as short as possible. However, in certain instances, as when the equipment is desired to perform only an early warning function, inability to detect targets at close range may be no particular disadvantage, and a relatively long pulse duration may be used without adversely affecting the ability of the system to perform its intended function.

Moreover, inasmuch as the minimum detectable radial target velocity is inversely related to the transmitted pulse duration, this factor can conveniently and advantageously be fixed so as to render the system unresponsive to low velocity targets and to signals from fixed targets which, in certain instances, may cause them to appear to move. Particularly, where the radar is airborne, this feature may be relied upon to reduce responses owing to the motion of the ground with reference to the system. Thus, in a system to be used against targets which may approach at high speeds, and hence not be observed until they are relatively close, the pulse length may, if the system is properly designed, be shortened to provide for detection at close range. On the other hand, in a system to be used primarily against targets approaching at relatively lower speeds, and which are hence more likely to be observed before they have come close to the radar, the relatively longer pulse duration may be used without imposing a serious limitation upon the capabilities of the system.

As to the frequency spectrum to be transmitted, it has been determined that this should correspond to that resulting from modulation of a high frequency carrier wave by time-spaced pulse signals having substantially rounded leading and trailing edges, and should not be such as would be produced from modulation by pulses having relatively steep or abruptly rising leading and trailing edges. In this manner, shifts in the frequencies of transmitted components upon reflection from target objects owing to causes other than target motion (e. g. shifts produced by sudden and substantial discontinuities in the reflective properties of a terrain or target area upon which transmitted pulses impinge) can be minimized so as to render shifts in frequency owing to target motion more readily detectable.

A further advantage of the system in accordance with the invention is that higher antenna scanning speeds may be used without causing fixed targets to appear as if they were moving. In a conventional storage type radar moving target indicator the antenna scanning speed cannot be increased beyond certain rather definite limits without rendering the system ineffectual to distinguish between fixed and moving targets. In the present system the antenna scanning speed can be increased by a factor which, roughly, is equal to the ratio of the minimum detectable radial target velocity (which, as above set forth, is determined by the transmitted pulse duration) divided by the minimum detectable target velocity of a conventional system.

Other objects and advantages of the invention will become apparent from a consideration of the following detailed description thereof with reference to the two representative embodiments shown respectively in the drawings comprising Figures 1 and 2.

Referring now to Figure 1, a typical system in accordance with the invention may comprise a pulse repetition frequency oscillator 1, generating time-spaced pulse signals of relatively short duration compared to their spacing, at a frequency which is primarily determined, as in a conventional radar system, by the maximum range of target against which the system is to operate. These time-spaced pulse signals are supplied to a modulator 2, where hey modulate a high frequency carrier of frequency $f_c$, which is preferably in the ultra-high frequency or microwave range, to produce similarly time-spaced pulses of ultra-high frequency energy. This energy will include sideband frequency components throughout a band in the vicinity of the carrier frequency $f_c$, which band will be more or less broad depending upon the steepness of the leading and trailing edges of the modulating pulses. As has already been mentioned, it is desired to limit the band of frequencies transmitted to a relatively narrow one in order to render the shifted frequency components, which will appear in reflections from moving targets, distinguishable from other components whose frequencies may differ from corresponding transmitted components owing to other phenomena. For example, assuming a carrier frequency $f_c$ of ten thousand megacycles, the principal band of frequencies to be transmitted might appropriately extend 10 kilocycles on either side of the carrier.

To this end modulated ultra-high frequency energy from modulator 2 may be supplied through a band-pass filter 3 and a conventional T-R box 4 to a scanning antenna 5 for transmission into space. As indicated in the figure, the filter may be adapted to pass a band of frequencies extending an amount $\Delta f_c$ on either side of the carrier $f_c$. For the specific example just recited, $\Delta f_c = 10$ kilocycles. Alternatively, of course, as will be apparent, the desired limited band of frequency components might be generated directly, and without the use of a filter, by using suitably rounded time-spaced pulse signals to modulate the high frequency carrier. But for convenience and effectiveness at the frequencies involved, the former method is preferable.

Another factor, which it is well to take into consideration in determining the width of the frequency spectrum of the transmitted signal, is the average or mean radial velocity of the targets which it is expected the system will be required to detect. By transmitting a band of a certain width, which can readily be determined in advance, it is possible to arrange that, upon reflection of a transmitted pulse from a target of specified radial velocity, all, or any predetermined fraction, of the transmitted energy will be translated so as to comprise frequency components outside the transmitted band. This will provide, at the receiver, a signal of maximum energy whenever a transmitted pulse is reflected from a target of average radial velocity.

Transmitted energy intercepted by target objects and reflected thereby will be picked up by antenna 5 and transmitted through T-R box 4 to a conventional mixer 6. Reflections from stationary targets will contain essentially the same frequency components as the transmitted signal. However, reflections of transmitted energy from targets moving with reference to the transmitter will, for the reasons hereinbefore given, contain additional frequency components outside the transmitted band and extending an amount $\Delta f_a$ either above or below the carrier frequency. The additional components will lie either above or below the transmitted band depending upon whether the target by which they are produced is approaching or receding from the transmitter. By eliminating frequency components of the received, reflected signal within the transmitted band, the remaining components of the signal outside this band may be used to indicate the presence of moving targets. This separation may be performed at radio-, or at video-frequency. If done at video frequency, the incoming signal must first be beat with a suitable "local oscillator" signal whose phase is cohered to that of the transmitted signal, and the resultant heterodyne signal then detected. The "local oscillator" signal may either be supplied by a suitably "cohered" local oscillator or the echo returned from landmass or sea may be used for the purpose, the use of such cohered oscillators being well known in the art and being discussed, for example, in Report No. M-218, dated June 1, 1945, of the Radiation Laboratory of the Massachusetts Institute of Technology, which is available in the Library of Congress. However it appears that separation can most effectively be performed at an intermediate frequency. To this end the received signal supplied to mixer 6 is first heterodyned with a signal from a local oscillator 7 of frequency $f_0$, whose phase need not be cohered to that of the transmitter. However the frequency, $f_0$, of this oscillator is preferably controlled with reference to the transmitter carrier frequency, $f_c$, through the medium of connection 8. The resultant heterodyne signal will likewise contain frequency components corresponding to both fixed and moving targets. The components corresponding to fixed targets are eliminated in an I. F. amplifier and band-rejection filter 9. The resultant output, containing information only as to moving targets, is detected, amplified and supplied to an appropriate indicator, all of which functions are conventional and are here represented as being performed in the block designated 10.

In general it will be desirable to combine the moving target information with corresponding information from fixed targets in order to provide a complete radar picture. Inasmuch as this does not constitute a part of the invention, per se, means are not shown for effecting this combination, which, however, can be done either electrically or optically in any conventional manner, as will be apparent to those skilled in the art. Thus the unfiltered signal from mixer 6 might be supplied to a separate detector and video amplifier system, the output of which might be supplied, along with the moving target output, in the desired proportions, to a common cathode ray tube or other suitable indicator.

There is another feature of operation, to which reference has not heretofore been made, which is incidental to the use of a relatively long transmitted pulse-length in order to enhance the production, in reflected pulses, of shifted-frequency components indicative of target motion. Prior experience indicated that the range accuracy of the system would decrease as the pulse-length increased. It has been determined, however, that, by proper design of filters used both in the transmitter and in the receiver, this effect can be appreciably mitigated, if not completely overcome. In particular it was found that this could be accomplished by increasing the sharpness of cut-off and the linearity of phase of both the transmitter and receiver filters. It was also determined that operation of the system as a whole could be improved by making the transmitter and receiver filters, as nearly as possible, complementary—that is, by making the "poles" and "zeroes" of the receiver filter correspond to the "zeroes" and "poles" respectively of the transmitter filter.

It will be readily apparent that the frequency components transmitted need not be confined to a single band but may be principally in a plurality of discrete bands, provided only that the number of such bands be finite, that the scope of each be limited, and that the receiver be caused to respond principally to frequency components of the received signal lying outside said bands. An example of such a system will be set forth hereinafter with reference to Figure 2.

It will also be apparent that, although the system of Figure 1 makes no provision for discrimination between approaching and receding targets, this feauture could readily be incorporated. For example this might be done merely by providing separate filters in the receiver—one responsive to frequency components lying above the transmitted band and corresponding to approaching targets, and the other responsive to frequency components lying below the transmitted band and corresponding to receding targets. The outputs from each of these filters could be supplied to separate indicators or could, through a combination of optical and electrical means, be made to yield a composite indication distinctively representing targets in both categories. Other methods of and means for achieving these results, in accordance with the present invention, will occur to those skilled in the art to which it relates.

In Figure 2 is shown a system in accordance with the invention, similar in many respects to the one shown in Figure 1, such similarity being indicated by the use of common reference characters for the identical portions of the systems of the two figures. In the system of Figure 2, however, principally the high-ordered sideband components of the modulated carrier signal generated in modulator 2 are transmitted. The low-ordered components immediately adjacent the carrier frequency are highly attenuated by means of a band-rejection filter, 11, adapted substantially to reject all components in a band extending an amount $\Delta f_c$ on either side of the carrier. As a result, frequency components in the received signal corresponding to radially moving targets will occur in the transmitter rejection band centered on the carrier frequency. Hence the receiver in this instance should be modified so as substantially to eliminate all components of the received signal except near the carrier frequency. This may be provided for by substituting, for the I. F. amplifier and band-rejection filter in the system of Figure 1, an I. F. amplifier and band-pass filter 12, as shown in Figure 2, which should be adapted to pass substantially unattenuated only those components of the intermediate signal corresponding to moving targets.

Inasmuch as all of the circuits employed in both of the systems described may be quite conventional, it is not deemed necessary to show schematic diagrams of any of them, nor to describe any of these circuits in detail, the foregoing description, together with the drawings, being sufficient to enable anyone skilled in the art to which this invention pertains to practice it. Although the invention has been described with reference to but two specific embodiments, it will be apparent to those skilled in the art that numerous modifications may be made without departing from the scope of the invention as defined by the appended claims.

I claim:

1. In a radar system for providing indications of moving objects and for discriminating against fixed objects, a transmitter comprising a source of periodic pulses of high frequency energy, the repetition period of said pulses being greater than the interval required for the propagation of electromagnetic energy from said radar system to the remotest moving object to be detected and return, said pulses having a time duration equal to a small fraction of said repetition period, said pulse duration being less than the interval required for the propagation of electromagnetic energy from said radar system to the nearest moving object to be detected and return, means for radiating said pulses of high frequency energy into space, and a first filter having a single passband located to pass the fundamental frequency component of said pulses and successively higher harmonic components of said pulses, said first filter being constructed and arranged to limit the band of frequency components radiated into space by said transmitter to said fundamental component and only the harmonic components required to preserve the above-mentioned relationship between the time widths of said periodic pulses and times of propagation of electromagnetic energy to the remotest and nearest moving objects to be detected, said first filter having rejection bands for rejecting all other frequency components generated by said transmitter, a receiver for receiving reflections of said transmitted pulses from target objects, means heterodyning said received reflections with a local oscillator signal to produce an intermediate frequency signal, a second filter supplied with said intermediate frequency signal, said second filter having a single rejection band located to reject frequency components of said intermediate frequency signal corresponding to components of said received reflections whose frequencies are the same as those transmitted by said transmitter and which are produced by reflections from fixed targets, and said second filter having at least a single passband located to pass at least some components of said intermediate frequency signal corresponding to components of said received signals whose frequencies differ from those of the components transmitted by said transmitter and which are produced by reflections from moving targets, and an indicator for indicating signal components passed by said second filter.

2. In a radar system for providing indications of moving objects and for discriminating against fixed objects, a transmitter comprising a source of periodic pulses of high frequency energy, the repetition period of said pulses being greater than the interval required for the propagation of electromagnetic energy from said radar system to the remotest moving object to be detected and return, said pulses having a time duration equal to a small fraction of said repetition period, said pulse duration being less than the interval required for the propagation of electromagnetic energy from said radar system to the nearest moving object to be detected and return, means for radiating said pulses of high frequency energy into space, and a first filter having a single passband located to pass the fundamental frequency component of said pulses and successively higher harmonic components of said pulses, said first filter being constructed and arranged to limit the band of frequency components radiated into space by said transmitter to said fundamental and only the harmonic components required to preserve the above-mentioned relationship between the time widths of said periodic pulses and the times of propagation of electromagnetic energy to the remotest and nearest moving objects to be detected, the passband of said first filter being sufficiently narrow to cause the periodic pulses passed by said first filter to have substantially rounded leading and trailing edges, said first filter having rejection bands for rejecting all other frequency components generated by said transmitter, a receiver for receiving reflections of said transmitted pulses from target objects, means for heterodyning said received reflections with a local oscillator signal to produce an intermediate frequency signal, a second filter supplied with said intermediate frequency signal, said second filter having a single rejection band located to reject frequency components of said intermediate frequency signal corresponding to components of said received reflections whose frequencies are the same as those transmitted by said transmitter and which are produced by reflections from fixed targets, and said second filter having at least a single passband located to pass at least some components of said intermediate frequency signal corresponding to components of said received signals whose frequencies differ from those of the components transmitted by said transmitter and which are produced by reflections from moving targets, and an indicator for indicating signal components passed by said second filter.

3. In a radar system for providing indications of moving objects and for discriminating against fixed objects, a transmitter comprising a source of periodic pulses of high frequency energy, the repetition period of said pulses being greater than the interval required for the propagation of electromagnetic energy from said radar system to the remotest moving object to be detected and return, said pulses having a time duration equal to a small fraction of said repetition period, said pulse duration being less than the interval required for the propagation of electromagnetic energy from said radar system to the nearest moving object to be detected and return, means for radiating said pulses of high frequency energy into space, and a first filter having a single passband located to pass the fundamental frequency component of said pulses and successively higher harmonic components of said pulses, said first filter being constructed and arranged to limit the band of frequency components radiated into space by said transmitter to said fundamental component and only the harmonic components required to preserve the above-mentioned relationship between the time widths of said periodic pulses and the times of propagation of electromagnetic energy to the remotest and nearest moving objects to be detected, said first filter having rejection bands for rejecting all other frequency components generated by said transmitter, a receiver for receiving reflections of said transmitted pulses from target objects, means for heterodyning said received reflections with a local oscillator signal to produce an intermediate frequency signal, said receiver including a second filter intermediate the input of said receiver and the output of said intermediate frequency amplifier, said second filter having a single rejection band so located as to exclude from the output of said intermediate frequency amplifier frequency components of said intermediate frequency signal corresponding to components of said received reflections whose frequencies are the same as those transmitted by said transmitter and which are produced by reflections from fixed targets, and said second filter having at least a single passband so located as to permit at least some components of the intermediate frequency signal corresponding to components of said received signals whose frequencies differ from those of the components transmitted by said transmitter and which are produced by reflections from moving targets to appear in the output of said intermediate frequency amplifier, and an indicator for indicating signal components passed by said second filter.

References Cited in the file of this patent
UNITED STATES PATENTS

| Number | Name | Date |
|---|---|---|
| Re. 21,955 | Chaffee | Nov. 25, 1941 |
| 1,750,668 | Green | Mar. 18, 1930 |
| 2,189,549 | Hershberger | Feb. 6, 1940 |
| 2,193,361 | Rice | Mar. 12, 1940 |
| 2,402,464 | Suter | June 18, 1946 |
| 2,406,316 | Blumlein et al. | Aug. 27, 1946 |
| 2,408,742 | Eaton | Oct. 8, 1946 |
| 2,422,064 | Anderson et al. | June 10, 1947 |
| 2,423,023 | Hershberger | June 24, 1947 |
| 2,479,568 | Hansen | Aug. 23, 1949 |